(12) United States Patent
Takaki (10) Patent No.: US 12,330,517 B2
(45) Date of Patent: Jun. 17, 2025

(54) WORKING MACHINE (71) Applicant: KUBOTA CORPORATION, Osaka (JP)

(72) Inventor: Takahiro Takaki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 612 days.

(21) Appl. No.: 17/840,145

(22) Filed: Jun. 14, 2022

(65) Prior Publication Data

US 2023/0019714 A1    Jan. 19, 2023

(30) Foreign Application Priority Data

Jul. 15, 2021   (JP) .................... 2021-117177

(51) Int. Cl.
*B60L 50/71* (2019.01)
*B60K 15/07* (2006.01)
*B60L 50/72* (2019.01)

(52) U.S. Cl.
CPC ............. *B60L 50/71* (2019.02); *B60K 15/07* (2013.01); *B60L 50/72* (2019.02); *B60L 2200/40* (2013.01); *B60Y 2200/221* (2013.01)

(58) Field of Classification Search
CPC ......... B60L 50/71; B60L 50/72; B60K 15/07; B60K 15/063; B60K 15/067; B60K 2015/0639
See application file for complete search history.

(56) References Cited

U.S. PATENT DOCUMENTS

| | | | | |
|---|---|---|---|---|
| 7,434,611 | B2* | 10/2008 | Wunderlich | B60H 1/00428 237/12.3 A |
| 8,302,997 | B2* | 11/2012 | Veenstra | B60K 15/07 280/832 |
| 9,114,930 | B2* | 8/2015 | Simmons | B65F 3/00 |
| 10,466,387 | B2* | 11/2019 | Ohmi | G01V 11/002 |
| 10,486,530 | B2* | 11/2019 | Matijevich | B60K 15/07 |
| 11,923,573 | B2* | 3/2024 | Sawada | H01M 8/04014 |

(Continued)

FOREIGN PATENT DOCUMENTS

| | | |
|---|---|---|
| CN | 110217116 A | 9/2019 |
| CN | 210149159 U | 3/2020 |

(Continued)

OTHER PUBLICATIONS

Office Action issued in Japan family member Patent Appl. No. 2021-117177, dated Aug. 20, 2024, along with an English translation thereof.

(Continued)

*Primary Examiner* — John D Walters
(74) *Attorney, Agent, or Firm* — GREENBLUM & BERNSTEIN, P.L.C.

(57) ABSTRACT

A working machine includes a vehicle body; a traveling device that supports the vehicle body; a drive that drives the traveling device; and a cabin that accommodates an operator seat. The drive has a drive motor that drives the traveling device; a fuel cell that supplies electric power to the drive motor; a controller that controls power supply from the fuel cell to the drive motor; and a hydrogen tank that supplies a hydrogen gas for fuel to the fuel cell. The hydrogen tank is disposed in an upper portion of an internal space of the cabin.

12 Claims, 7 Drawing Sheets

(56) References Cited

U.S. PATENT DOCUMENTS

| | | | |
|---|---|---|---|
| 2005/0087332 A1 | 4/2005 | Umeo et al. | |
| 2009/0032318 A1* | 2/2009 | Ishitoya | B60K 15/013 180/65.31 |
| 2015/0123393 A1* | 5/2015 | Jackson | B60K 15/07 280/834 |
| 2017/0299769 A1 | 10/2017 | Ohmi et al. | |
| 2021/0129688 A1 | 5/2021 | Sawada et al. | |
| 2021/0135255 A1 | 5/2021 | Sawada et al. | |

FOREIGN PATENT DOCUMENTS

| | | | |
|---|---|---|---|
| DE | 102007006047 | | 8/2008 |
| EP | 2505403 | | 10/2012 |
| EP | 2868509 | | 5/2015 |
| JP | 2003-149071 | A | 5/2003 |
| JP | 7-025225 | A | 1/2005 |
| JP | 2005-125896 | A | 5/2005 |
| JP | 2010-23550 | A | 2/2010 |
| JP | 2013247051 | A | 12/2013 |
| JP | 2017-193214 | A | 10/2017 |
| JP | 2020-198220 | A | 12/2020 |
| JP | 2021-000899 | A | 1/2021 |
| JP | 2021-070395 | A | 5/2021 |
| JP | 2021-075076 | A | 5/2021 |
| JP | 2021-075077 | A | 5/2021 |
| KR | 20030067117 | | 8/2003 |
| WO | WO-2018234810 A1 * | | 12/2018 ............... E02F 9/08 |

OTHER PUBLICATIONS

Official Communication issued in family member European Patent Office (EPO) Patent Application No. 24174643.7, dated Oct. 15, 2024.

European Search Report issued with respect to European Patent Application No. 22179424.1, 2868509 dated Dec. 2, 2022.

* cited by examiner

WORKING MACHINE

CROSS REFERENCE TO RELATED APPLICATIONS

This application claims the benefit of priority to Japanese Patent Application No. 2021-117177 filed on Jul. 15, 2021. The entire contents of this application are hereby incorporated herein by reference.

BACKGROUND OF THE INVENTION

1. Field of the Invention

The present invention relates to a working machine such as agricultural machinery including a tractor and the like, or construction machinery and relates, in particular, to a working machine that includes a cabin that accommodates an operator seat.

2. Description of the Related Art

In Japanese Unexamined Patent Application Publication No. 2021-00899, a fuel tank is accommodated together with an engine, which is a driving source, in a hood, thereby making the entirety of a tractor and a fuel supply path compact. A tractor that includes an engine and a cabin is disclosed.

In the recent automobile industry, a fuel cell vehicle (FCV) that does not discharge harmful substances such as carbon dioxide by using a gaseous fuel such as a hydrogen gas, instead of an internal combustion engine that uses a fossil fuel, has been developed from the point of view of protecting global environment by preventing global warming. In this fuel cell vehicle, for example, as in Japanese Unexamined Patent Application Publication No. 2010-23550, a fuel cell is mounted under a front seat, a hydrogen tank is housed at the rear or below a rear seat, and a drive motor is disposed close to driving wheels. As the hydrogen tank, a high-pressure hydrogen tank reinforced with a carbon fiber reinforced plastic (CFRP) to resist a high pressure of 70 MPa has been often used.

SUMMARY OF THE INVENTION

High-pressure hydrogen tanks of fuel cell vehicles are legally regulated to be kept less than or equal to 85° C. from the point of view of the strength of carbon fiber reinforced plastic. Meanwhile, it has been known that, when a hydrogen gas is rapidly charged with a high pressure into a high-pressure hydrogen tank, the temperature of the charged hydrogen gas in the inside of the high-pressure hydrogen tank rises sharply.

When a fuel cell is mounted on an agricultural tractor, as an example of a working machine, a high-pressure hydrogen tank may be considered to be disposed together with a heat generating member, such as the fuel cell, in a hood. Generally, an agricultural tractor often performs long continuous work under a situation in which the outside air temperature is high, and the temperature in the inside of the hood may become approximately 60° C. Therefore, when a hydrogen gas is charged immediately after continuous work, the temperature in the inside of the high-pressure hydrogen tank may become more than or equal to 85° C.

The present invention has been made to address such issues in the related art, and an object of the present invention is to provide a working machine, such as a tractor, capable of protecting a hydrogen tank from vibration, a fall, and the like of the working machine and suppressing an increase in the temperature of the hydrogen tank while contributing to prevention of global warming, as a matter of course.

A working machine according to one aspect of the present invention includes a vehicle body; a traveling device that supports the vehicle body; a drive that drives the traveling device; and a cabin that accommodates an operator seat. The drive has a drive motor that drives the traveling device, a fuel cell that supplies electric power to the drive motor, a controller that controls power supply from the fuel cell to the drive motor, and a hydrogen tank that supplies a hydrogen gas for fuel to the fuel cell. The hydrogen tank is disposed in an upper portion of an internal space of the cabin.

The working machine may further include a hydrogen-gas detection portion that detects the hydrogen gas. The hydrogen-gas detection portion may be disposed in the upper portion of the internal space of the cabin.

An exhaust door that is opened when the hydrogen-gas detection portion detects the hydrogen gas and that causes the internal space of the cabin and the outside to be in communication with each other may be further provided in a ceiling wall of the cabin.

A ventilator that performs ventilation of the internal space of the cabin may be further provided in the cabin. The ventilator may perform the ventilation at least while the hydrogen tank supplies the hydrogen gas to the fuel cell.

The working machine may further include a hydrogen-gas detection portion that detects the hydrogen gas. The ventilator may increase an output of the ventilation when the hydrogen-gas detection portion detects the hydrogen gas.

The working machine may further include an air conditioning unit that generates cooling air and that introduces the cooling air to the inside of the cabin. The cabin may be provided with a cooling passage through which the cooling air introduced from the air conditioning unit passes the outer periphery of the hydrogen tank.

The working machine may further include an air conditioning unit that introduces outside air to the inside of the cabin. An outside-air intake port for the air conditioning unit may be provided in the cabin, and a guide passage through which the outside air taken in from the outside-air intake port passes the outer periphery of the hydrogen tank may be provided.

A ceiling wall of the cabin may have a double structure including a first wall on the upper side and a second wall on the lower side. The guide passage may be formed by a space that is defined by the first wall and the second wall.

A ceiling wall of the cabin may have a double structure including a first wall on the upper side and a second wall on the lower side, and the hydrogen tank may be disposed in a space that is defined by the first wall and the second wall.

The working machine may further include a housing case that houses the hydrogen tank. The housing case may store water that cools the hydrogen tank.

The working machine may further include a housing case that houses the hydrogen tank. The hydrogen tank may be installed via a vibration absorbing member with respect to a placement surface formed in the inside of the housing case.

The hydrogen tank may have a liner that has the internal space filled with the hydrogen gas. An outer surface of the liner may be covered with a carbon fiber reinforced plastic layer.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments according to the present invention will be described with reference to the drawings. In the following embodiments, similar components are given the same reference signs, and description thereof is omitted.

First Embodiment

FIG. 1 to FIG. 4 illustrate an agricultural tractor (working machine) 1 and components thereof according to the first embodiment of the present invention. In the present embodiment, a vehicle traveling direction (forward arrow) will be described as "forward" of the tractor 1 and components for the tractor, an opposite direction of the vehicle traveling direction will be described as "rearward", and the left-right direction as viewed from a boarded operator will be described as "left and right" of the tractor 1 and the components for the tractor. The horizontal direction orthogonal to a vehicle-body front-rear direction will be described as the "width direction" of the tractor 1.

Figure 1:
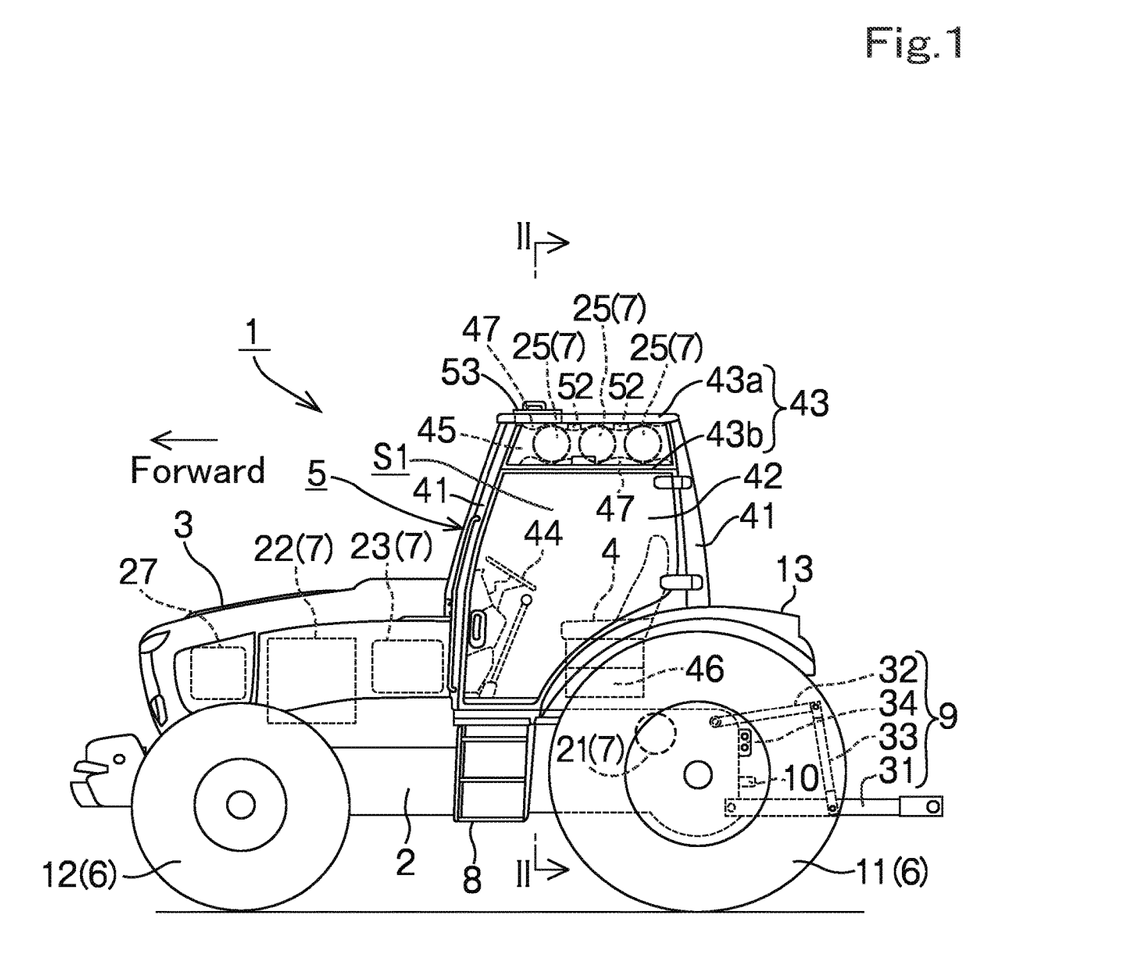
FIG. 1 is a schematic side view of an agricultural tractor according to a first embodiment of the present invention.

FIG. 1 is a schematic side view of the agricultural tractor 1 according to the first embodiment of the present invention. The tractor 1 in FIG. 1 shows the left side of the entirety of the tractor. The tractor 1 in FIG. 1 includes a vehicle body 2 that is long in the front-rear direction; a hood 3 that is provided at a front portion of the vehicle body 2; a cabin 5 that is mounted on a rear portion of the vehicle body 2 to accommodate an operator seat 4 on which an operator is to sit; a wheel-type traveling device 6 that supports the vehicle body 2 to be capable of traveling; a drive 7 that drives the traveling device 6; a three-point linkage 9 that is provided at the rear end of the vehicle body 2; and a PTO shaft (power extraction shaft) 10 that transmits power from the drive 7.

The traveling device 6 in FIG. 1 includes a left-right pair of rear wheels 11 and a left-right pair of front wheels 12. An upper portion of each of the rear wheels 11 is covered by a fender 13. Here, the traveling device 6 employs a four-wheel drive system of a two-wheel-drive/four-wheel-drive switching type and is switchable between a two-wheel drive state in which only the rear wheels 11 are driven and a four-wheel drive state in which the rear wheels 11 and the front wheels 12 are driven. The present invention is also applicable to a tractor that includes a traveling device employing a two-wheel drive system in which only rear wheels are driven or a caterpillar track system (crawler type).

The drive 7 in FIG. 1 includes an AC drive motor (electric motor) 21 that is disposed in the vicinity of the rear wheels 11 and that drives the wheels or crawlers of the traveling device 6; a fuel cell 22 that is disposed in the inside of the hood 3 and that supplies electric power to the drive motor 21; a controller 23 that is disposed in the inside of the hood 3 and that controls power supply from the fuel cell 22 to the drive motor 21; three hydrogen tanks 25 that are disposed in an upper portion of an internal space S1 of the cabin 5 and that supply a hydrogen gas for fuel to the fuel cell 22; a hydrogen-gas detector (hydrogen-gas detection portion) 52 that is disposed in an upper portion of the internal space S1 of the cabin 5 and that detects the hydrogen gas; and an exhaust door 53 that is provided in a ceiling wall 43 of the cabin 5, that is to be opened when the hydrogen-gas detector 52 detects the hydrogen gas, and that causes the internal space S1 of the cabin 5 and the outside to be in communication with each other. In the present embodiment, an example in which three hydrogen tanks are disposed has been described for convenience. The present invention is, however, not limited thereto and may be configured such that, for example, one or a plural number other than three of hydrogen tanks are disposed. Here, the plural number of hydrogen tanks may be connected in series or may be connected in parallel.

An output shaft of the drive motor 21 is interlocked and coupled with axles of the rear wheels 11 indirectly via a transmission mechanism or directly and interlocked and coupled with the front wheels 12 via a two-wheel-drive/four-wheel-drive switching mechanism in a switchable manner. The fuel cell 22 generates electric power by causing the hydrogen gas supplied from the hydrogen tanks 25 to react with air (oxygen) that is taken in from the outside, and supplies the electric power to the drive motor 21. The controller 23 has an inverter function. The controller 23 converts DC electricity generated in the fuel cell 22 into AC electricity, and controls rotation of the drive motor 21 by controlling frequency. In the inside of the hood 3, a battery 27 that stores surplus electricity of electric power supplied from the fuel cell 22 to the drive motor 21 is disposed.

The three-point linkage 9 includes a left-right pair of lower links 31 that are supported at a rear-end lower portion of the vehicle body 2 to be vertically turnable; a left-right pair of lift arms 32 that are supported at a rear-end upper portion of the vehicle body 2 to be vertically turnable and that are driven by a hydraulic device; a coupling link 33 that couples rear end portions of the lift arms 32 and intermediate portions of the lower links 31 to each other and that turns the lower links 31 by turning of the lift arms 32; and a bracket 34 for mounting an upper link The upper link coupled to rear end portions of the left-right pair of lower links 31 and the bracket 34 supports a working device of various types to be vertically movable. An input portion of the working device of various types is coupled to a PTO shaft 10 via a drive shaft. The PTO shaft 10 is rotated by power transmitted from the drive motor 21. Here, the working device is, for example, a cultivator for cultivation, a fertilizer spreader for spreading a fertilizer, an agricultural chemical spreader for spreading an agricultural chemical, a harvester for harvesting, a mower for mowing grass or the like, a tedder for tedding grass or the like, a rake for raking grass or the like, and a baler (roll baler) for baling grass or the like.

Next, the hydrogen tanks 25, the hydrogen-gas detector (hydrogen-gas detection portion) 52, and the exhaust door 53 that are disposed in an upper portion of the internal space S1 of the cabin 5 in FIG. 1, and each attachment structure thereof will be described in detail.

The cabin 5 in FIG. 1 includes four cabin frames (supports) 41 that extend upward from four corners; a transparent wall (no reference sign) that covers the front surface, the right surface, and the rear surface thereof; transparent boarding doors 42 that cover the left and right surfaces thereof; and the ceiling wall 43. Here, a steering device 44 including a steering wheel and the like is disposed forward of the operator seat 4, and an air conditioning (air conditioner) unit 46 that performs air-conditioning of the internal space S1 of the cabin 5 is disposed under the operator seat 4. At least one boarding step 8 on which an operator places his/her feet when getting on and off the cabin 5 is disposed below the cabin 5. Here, the boarding step 8 is provided below each of the boarding doors 42 at the left and the right.

The ceiling wall 43 has a double structure including a first wall 43a on the upper side and a second wall 43b on the lower side that face each other vertically. The three hydrogen tanks 25 are disposed in a ceiling space (guide passage) 45 between the first wall 43a and the second wall 43b. Here, the ceiling space (guide passage) 45 is formed by a space that is defined by the first wall 43a and the second wall 43b. The three hydrogen tanks 25 each have a cylindrical shape and extend in the width direction to be disposed at equal intervals in the front-rear direction. Each of the hydrogen tanks 25 is supported by the first wall 43a and the second wall 43b via a vibration absorbing member 47 made of rubber or the like. Here, the lower surface of the first wall 43a is provided with the hydrogen-gas detector (hydrogen-gas detection portion) 52, and a front portion of the first wall 43a is provided with the exhaust door 53 of a sliding type. The exhaust door 53 is provided with an actuator (not illustrated) interlocked with the hydrogen-gas detector 52. When the hydrogen-gas detector 52 detects a certain amount or more of the hydrogen gas, the exhaust door 53 is automatically opened to release, via the exhaust door 53, the hydrogen that has leaked in the inside of the ceiling space 45.

Figure 2:
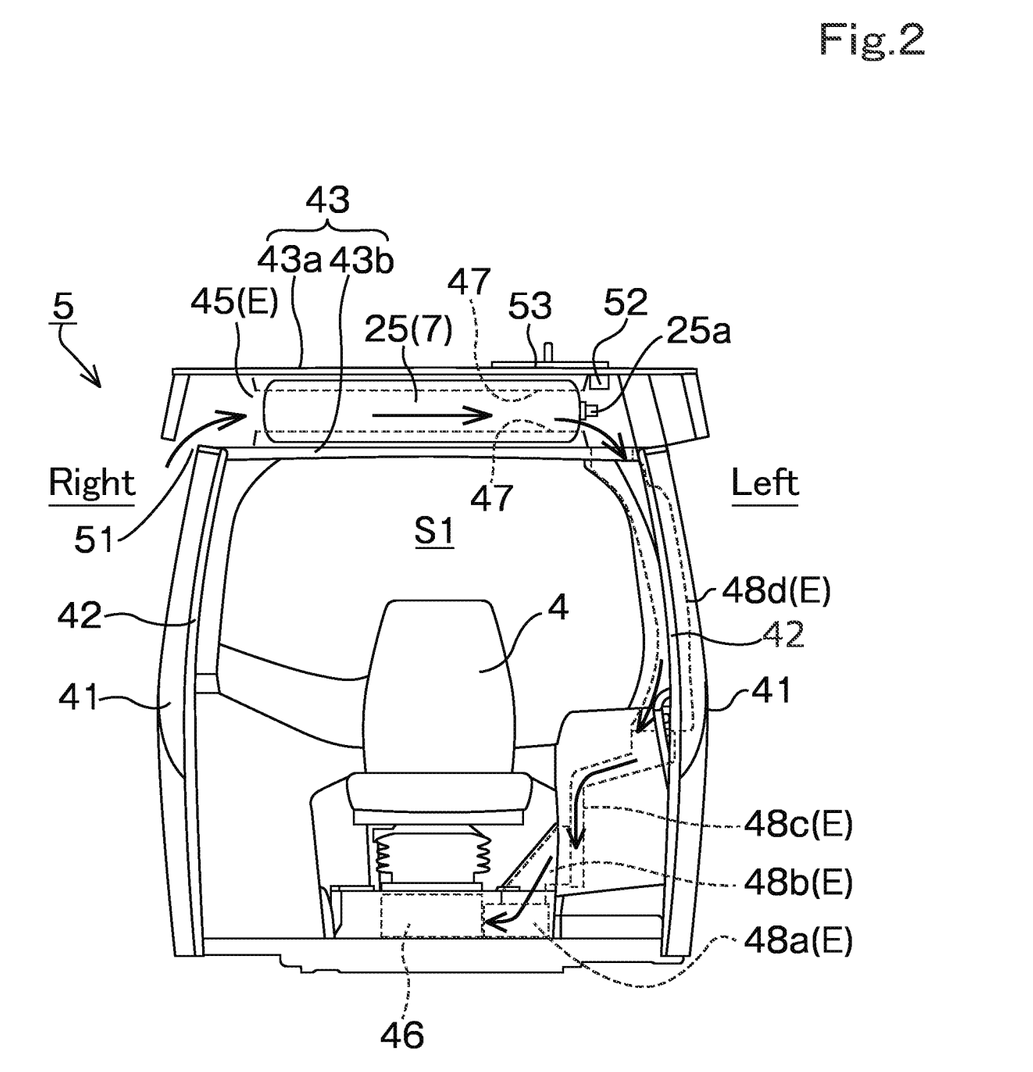
FIG. 2 is a schematic sectional view of a cabin of the tractor in FIG. 1 along line II-II.

FIG. 2 is a schematic sectional view taken along line II-II in FIG. 1 and clarifies an arrangement of the hydrogen tanks 25 and a structure of an outside-air introduction path E of the air conditioning unit 46.

Referring to FIG. 2, the air conditioning unit 46 has a cooling function, a heating function, and a blowing function. To the air conditioning unit 46, the outside-air introduction path E for introducing outside air is connected. The outside-air introduction path E includes a plurality of ducts 48a, 48b, 48c, and 48d that are connected to extend upward along the left side of the cabin 5 from an introduction port in the left surface of the air conditioning unit 46, and the ceiling space 45 in communication with the upper end of the uppermost duct 48d. The ceiling space 45 that houses the hydrogen tanks 25 is used as a guide passage for outside air. A right end portion of the ceiling space 45 has an outside-air intake port 51 that opens downward with respect to the outside. Here, the air conditioning unit 46 is configured to introduce outside air to the inside of the cabin 5. In detail, the outside-air intake port 51 for the air conditioning unit 46 is provided in the cabin 5, and the ceiling space (guide passage) 45 in which the outside air that is taken in from the outside-air intake port 51 passes the outer peripheries of the hydrogen tanks 25 is provided. That is, the outside-air introduction path E crosses the ceiling space (guide passage) 45 from the right to the left from the outside-air intake port 51, extends downward from a left end portion of the ceiling space (guide passage) 45 through the plurality of ducts 48d, 48c, and 48b and finally reaches the air conditioning unit 46 via the lowermost duct 48a.

The hydrogen-gas detector 52 is disposed in the vicinity of caps 25a of the hydrogen tanks 25 and attached to the lower surface of the first wall 43a of the ceiling wall 43.

Figure 3:
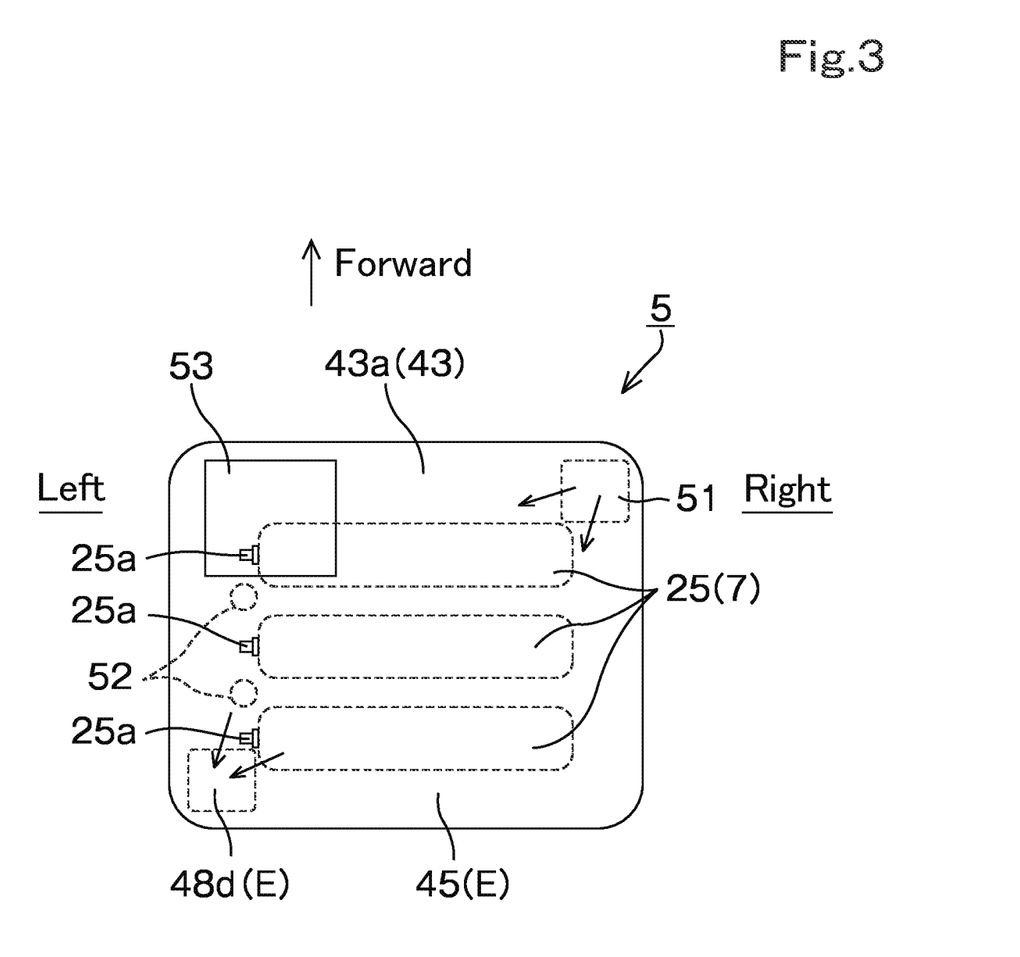
FIG. 3 is a plan view of the cabin in FIG. 1.

FIG. 3 is a plan view (top view) of the cabin 5. The outside-air intake port 51 is positioned at a right front-end portion of the ceiling wall 43 while the upper end of the uppermost duct 48d is positioned at a left rear-end portion of the ceiling wall 43. The sliding-type exhaust door 53 is positioned in the vicinity of the caps 25a of the hydrogen tanks 25.

Figure 4:
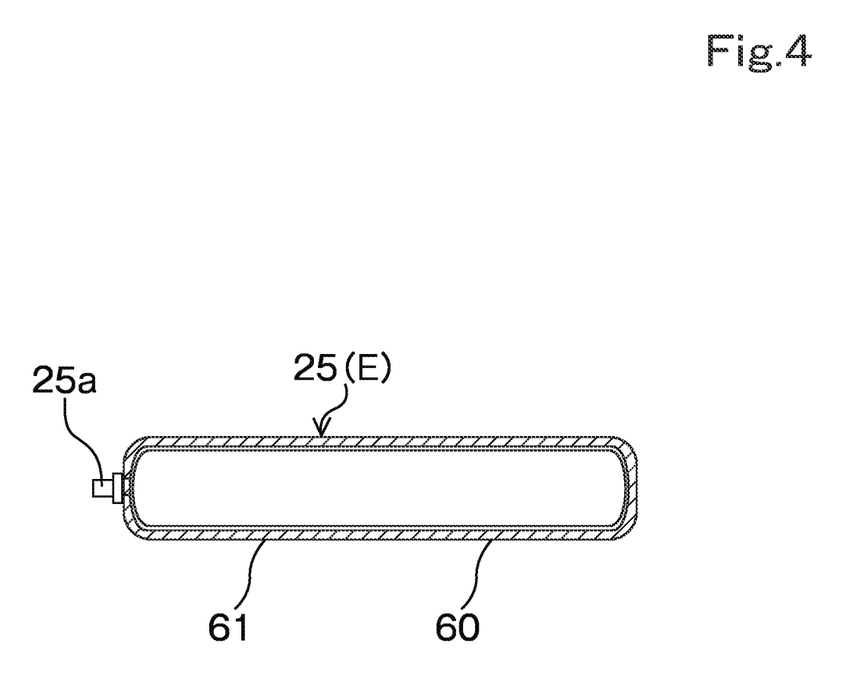
FIG. 4 is a schematic vertical sectional view of a hydrogen tank in FIG. 1.

FIG. 4 is a longitudinal sectional view of the hydrogen tank 25. The hydrogen tank 25 has a liner 60 having an internal space filled with the hydrogen gas. An outer surface of the liner 60 is covered with a carbon fiber reinforced plastic (CFRP) layer 61. Here, the liner 60 accommodates a high-pressure gas, accommodates the hydrogen gas by increasing pressure of the hydrogen gas or cooling the hydrogen gas, and releases the hydrogen gas by decreasing the pressure of the hydrogen gas or heating the hydrogen gas. The hydrogen tank 25 is a high-pressure hydrogen tank. With this configuration, it is possible to accommodate a large amount of the hydrogen gas while reducing the weight of the hydrogen tank, which achieves easy handling of the hydrogen tank and a reduction in the weight of a vehicle.

Operation and effects of the tractor 1 configured as described above and on which the hydrogen tanks 25 are mounted will be described below.

First, basic operation of the drive 7 that uses the fuel cell 22 mounted on the tractor 1, which is the working machine according to the present embodiment, will be described. The fuel cell 22 generates electric power by causing the hydrogen gas supplied from the high-pressure hydrogen tanks 25 to react with air (oxygen) taken in from the outside air. A substance discharged at this time is only water, and harmful substances, such as carbon dioxide, are not discharged.

Generated DC electric power is converted into AC electric power and subjected to frequency control by the controller 23. The AC electric power is supplied to the drive motor 21 and rotates the output shaft of the drive motor 21 at a desired rotational speed.

The rotational power of the drive motor 21 is transmitted to the axles of the rear wheels 11 indirectly via the transmission mechanism or directly and rotates the rear wheels 11 to cause traveling in, for example, the two-wheel drive state. The rotational power is also transmitted to the front wheels 12, as necessary, to cause traveling in the four-wheel drive state. Further, the rotational power is also transmitted to the PTO shaft 10 to drive a working device.

Next, when the air conditioning unit 46 is actuated, the outside air taken in from the outside-air intake port 51 in the ceiling wall 43 is introduced to the air conditioning unit 46 through the outside-air introduction path E. In this introduction process, the ceiling space 45 housing the hydrogen tanks 25 is used as a guide passage. Thus, the hydrogen tanks 25 are actively cooled by the outside air passing the peripheries of the hydrogen tanks 25 in the inside of the ceiling space 45. That is, it is possible to suppress a temperature increase of the hydrogen tanks 25.

Here, when the tractor 1 falls down, damage to the hydrogen tanks 25 can be avoided since the hydrogen tanks 25 are protected by the ceiling wall 43 of the cabin 5.

When the hydrogen gas leaks in the inside of the ceiling space 45, the hydrogen-gas detector 52 disposed in the vicinity of the caps 25a of the hydrogen tanks 25 detects the leaked hydrogen gas and immediately opens the exhaust door 53. Accordingly, it is possible to discharge via the exhaust door 53 the leaked hydrogen gas immediately after the hydrogen gas leaks in the inside of the ceiling space 45.

Effects in the present embodiment are summarized as follows.

Since the hydrogen tanks 25 are disposed in the upper portion of the internal space S1 of the cabin 5, an arrangement space can be easily ensured, and a temperature increase of the hydrogen tanks 25 can be further suppressed compared with, for example, a case in which the hydrogen tanks 25 are accommodated together with a heat generating member such as a fuel cell in the inside of the hood.

Since the hydrogen tanks 25 are disposed in the inside of the cabin 5, the hydrogen tanks 25 can be protected also from vibration from the outside and vibration due to a fall and the like of the tractor 1.

Since the outer surface of the liner 60 is covered with the carbon fiber reinforced plastic layer 61, the weight of the hydrogen tank 25 is reduced compared with a conventional high-pressure hydrogen tank. Accordingly, it is possible to house a large amount of the hydrogen gas while reducing the weight of the hydrogen tank 25, which achieves easy handling of the hydrogen tank 25 and a reduction in the weight of a vehicle.

Since the hydrogen-gas detector 52 is disposed in the upper portion of the internal space S1 of the cabin 5, even if the hydrogen gas leaks, hydrogen-gas leakage can be detected in an early stage and can be dealt with.

In addition, since the exhaust door 53 interlocked with the hydrogen-gas detector 52 is provided in the ceiling wall 43 (first wall 43a), it is possible to automatically open the exhaust door 53 quickly when detecting leaked hydrogen gas and immediately discharge the leaked hydrogen gas upward from the inside of the cabin 5.

Since the air conditioning unit 46 that adjusts air in the inside of the cabin 5 is included, it is possible to adjust the temperature at the peripheries of the hydrogen tanks 25 without additionally providing a cooler for the high-pressure hydrogen tanks intentionally. Further, since the outside air taken in from the outside-air intake port 51 in the ceiling wall 43 passes the peripheries of the hydrogen tanks 25 in the inside of the ceiling space (guide passage 45), it is possible to efficiently use the outside air for the air conditioning unit 46 to cool the hydrogen tanks 25.

The ceiling wall 43 of the cabin 5 has the double structure including the first wall 43a on the upper side and the second wall 43b on the lower side, and the ceiling space 45 between the first wall 43a and the second wall 43b is used as a guide passage for outside-air introduction of the air conditioning unit 46. Accordingly, it is possible to reduce the costs of the vehicle and maintain the compact characteristics since the existing structure is used without additionally providing a guide passage for outside-air introduction of the air conditioning unit 46.

Since the hydrogen tanks 25 are disposed in the ceiling space 45 between the first wall 43a and the second wall 43b, the function of protecting the high-pressure hydrogen tanks 25 from external obstacles is improved.

Second Embodiment

In the first embodiment described above, there is provided the exhaust door 53 that is automatically opened when the hydrogen-gas detector 52 detects a certain amount or more of the hydrogen gas. In contrast, the present embodiment is characterized in that a ventilator 63 that performs ventilation of the internal space S1 of the cabin 5 is further provided.

Figure 5:
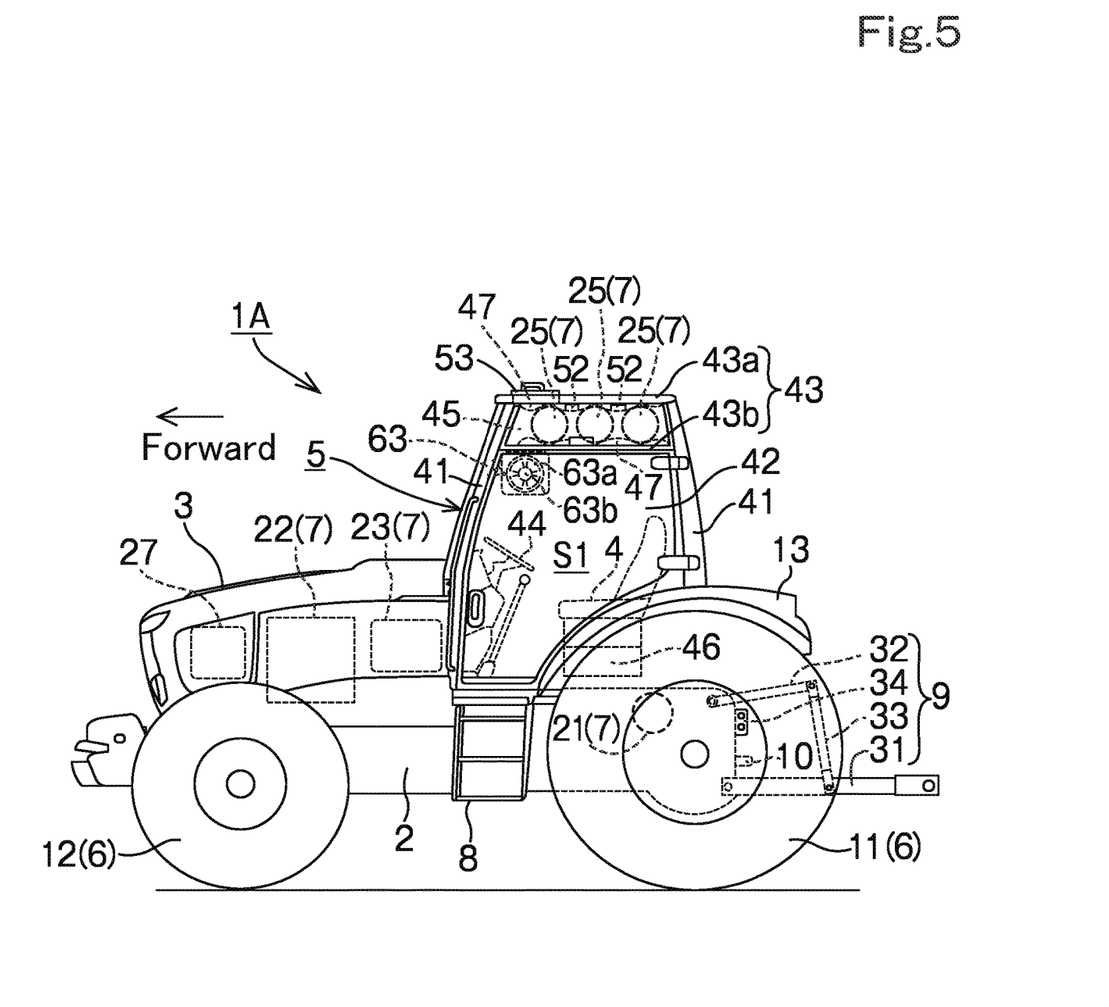
FIG. 5 is a schematic side view of an agricultural tractor according to a second embodiment of the present invention.

FIG. 5 is a schematic side view of an agricultural tractor 1A according to the second embodiment of the present invention. The tractor 1A in FIG. 5 differs from the tractor 1 in FIG. 1 in that the ventilator 63 is provided at an upper portion of the right side wall of the cabin 5. The ventilator 63 in FIG. 5 performs the ventilation of the internal space S1 of the cabin 5 at least while the hydrogen tanks 25 supply the hydrogen gas to the fuel cell 22. With this configuration, an increase in the temperature of the internal space S1 of the cabin 5 can be suppressed, and, eventually, an increase in the temperatures of the hydrogen tanks 25 can be suppressed.

The ventilator 63 in FIG. 5 includes a fan 63a and a motor 63b. To the motor 63b, electric power is supplied from the fuel cell 22. The motor 63b is electrically connected to the controller 23. Here, while the hydrogen gas is supplied from the hydrogen tanks 25 to the fuel cell 22, the controller 23 actuates the motor 63b to perform the ventilation of the internal space S1 of the cabin 5. The motor 63b is configured to be supplied with electric power from the fuel cell 22, but may be configured such that electric power is supplied to the motor 63b from the battery 27 disposed in the inside of the hood 3. The controller 23 is electrically connected to the hydrogen-gas detector 52. When the hydrogen-gas detector 52 detects leakage of the hydrogen gas, the controller 23 increases the output of the ventilation of the ventilator 63 by controlling such that the rotation speed of the motor 63b is increased. With this configuration, when leakage of the hydrogen gas from the hydrogen tanks 25 occurs, the leaked hydrogen gas in the inside of the cabin 5 can be discharged to the outside of the cabin 5.

The operation of the tractor 1A according to the second embodiment configured as described above is similar to the operation of the tractor 1 according to the first embodiment.

With the tractor 1A according to the above embodiment, compared with the tractor 1 according to the first embodiment, an increase in the temperatures of the hydrogen tanks 25 disposed in the inside of the cabin 5 can be suppressed, and, when leakage of the hydrogen gas occurs, the leaked hydrogen gas in the inside of the cabin 5 can be discharged to the outside of the cabin 5 since the output of the motor 63b of the ventilator 63 is increased when the hydrogen-gas detector 52 detects the hydrogen gas.

Third Embodiment

Figure 6:
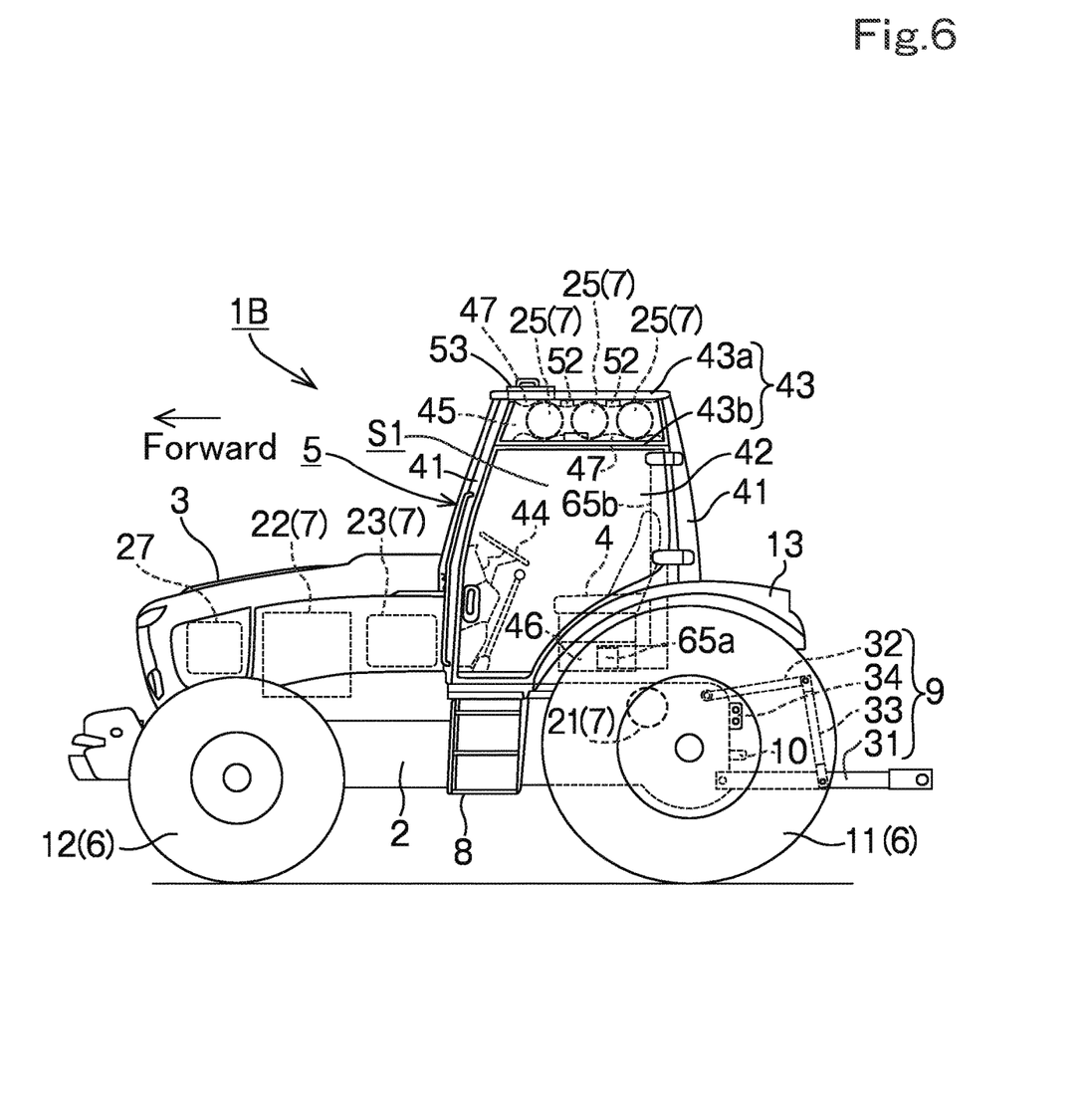
FIG. 6 is a schematic side view of an agricultural tractor according to a third embodiment of the present invention.

FIG. 6 is a schematic side view of an agricultural tractor 1B according to the third embodiment of the present invention. The tractor 1B in FIG. 6 differs from the tractor 1 in FIG. 1 in that the ceiling space 45 is used as a cooling passage for cooling air that is delivered from the air conditioning unit 46 to the inside of the cabin 5 in the tractor 1B in FIG. 6 while the ceiling space 45 in FIG. 1 is used as the guide passage for outside-air intake of the air conditioning unit 46.

In detail, referring to FIG. 6, the air conditioning unit 46 that generates cooling air and that introduces the cooling air to the inside of the cabin 5 is provided under the operator seat 4. Here, the ceiling space 45 of the cabin 5 is used as a cooling passage through which part or entirety of the cooling air generated by the air conditioning unit 46 passes the peripheries of the hydrogen tanks 25. That is, the cabin 5 is provided with a duct 65b that introduces the cooling air or part thereof from a cooling-air introduction port 65a of the air conditioning unit 46 to the ceiling space (cooling passage) 45. With this configuration, a temperature increase of the hydrogen tanks 25 can be further suppressed since the cooling air introduced from the air conditioning unit 46 passes the outer peripheries of the hydrogen tanks 25.

The operation of the tractor 1B according to the third embodiment configured as described above is similar to the operation of the tractor 1 according to the first embodiment.

With the tractor 1B according to the above embodiment, compared with the tractor 1 according to the first embodiment, it is possible to cool the hydrogen tanks 25 without additionally providing cooling equipment since the air conditioning unit 46 for cooling the cabin 5 can be also used to cool the hydrogen tanks 25. Accordingly, it is possible to reduce costs for additionally providing a cooling equipment and possible to improve the cooling effect.

Figure 7:
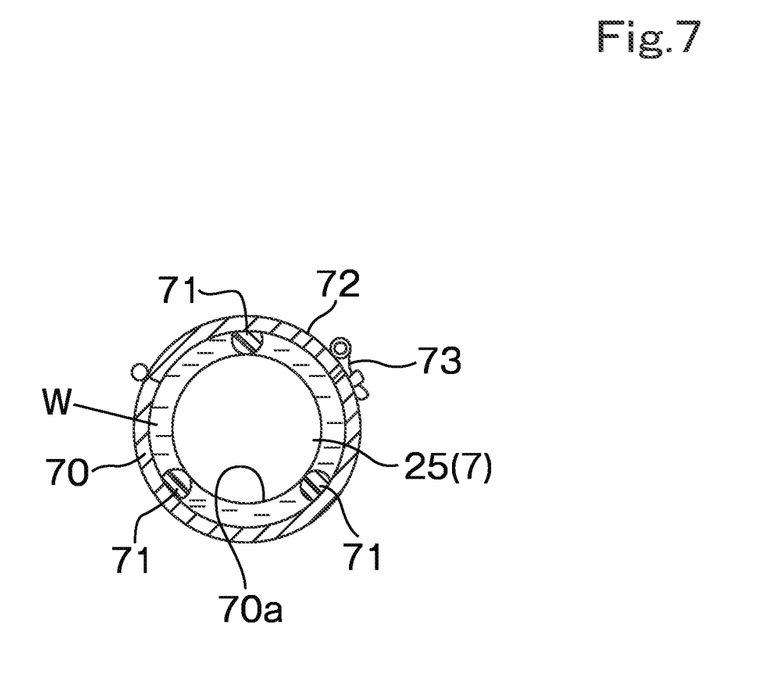
FIG. 7 is a sectional view of a supporting mechanism of a hydrogen tank in FIG. 1 according to a modification of the present invention.

Other Embodiments (1) FIG. 7 illustrates a modification of the supporting mechanism for the hydrogen tank 25 and illustrates an example in which a cylindrical metallic housing case 70 is used. On an inner surface (placement surface) 70a of the housing case 70, a plurality of vibration absorbing members 71 that are made of rubber are provided at equal intervals in the circumferential direction of the tank. Water W for cooling is stored in the inside of the housing case 70. The hydrogen tank 25 is housed in the inside of this housing case 70 and elastically supported by three vibration absorbing members 71. Here, the housing case 70 that houses the hydrogen tank 25 is included, and the housing case 70 stores water that cools the hydrogen tank 25. With this configuration, it is possible to efficiently cool the high-pressure hydrogen tank 25 actively and also possible with respect to impact or vibration from the outside to further absorb the impact or the vibration by buffering by the water W. The hydrogen tank 25 may be configured to be installed via the vibration absorbing members 71 with respect to the placement surface formed in the inside of the housing case 70.

Here, the housing case 70 has an openable-closable cover 72. The inside of the housing case 70 can be maintained in a sealed state by closing the cover 72 in a fluid-tight state by a lock clamp mechanism 73. The housing case 70 is disposed, for example, in the inside of the ceiling space 45 of the ceiling wall 43 in FIG. 1, or is attached to the lower surface of a ceiling space (not illustrated) that does not have a double structure.

According to the modification in FIG. 7, it is possible to efficiently cool the high-pressure hydrogen tank 25 actively, and also possible with respect to impact or vibration from the outside to further absorb the impact or the vibration by the absorbing effect of the vibration absorbing members 71 and buffering by the water W.

(2) The working machine to which the present invention is applied is not limited to an agricultural tractor. The present invention is applicable to a large combine having a cabin, or construction machinery such as a backhoe having a cabin.

As described above, the working machine 1 according to a first aspect of the present invention is the working machine 1 that includes the vehicle body 2; the traveling device 6 that supports the vehicle body 2; the drive 7 that drives the traveling device 6; and the cabin 5 that accommodates the operator seat 4. The drive 7 has the drive motor 21 that drives the traveling device 6; the fuel cell 22 that supplies electric power to the drive motor 21; the controller 23 that controls power supply from the fuel cell 22 to the drive motor 21; and the hydrogen tanks 25 that supply the hydrogen gas for fuel to the fuel cell 22. The hydrogen tanks 25 are disposed in the upper portion of the internal space S1 of the cabin 5.

With this configuration, compared with a case, for example, in which the hydrogen tanks 25 are accommodated together with a heat generating member such as the fuel cell 22 in the inside of the hood 3, an arrangement space can be easily ensured, and a temperature increase of the hydrogen tanks 25 can be further suppressed since the hydrogen tanks 25 are disposed in the upper portion of the internal space S1 of the cabin 5.

The working machine 1 further includes the hydrogen-gas detection portion 52 that detects the hydrogen gas. The hydrogen-gas detection portion 52 is disposed in the upper portion of the internal space S1 of the cabin 5.

With this configuration, since the hydrogen-gas detection portion 52 is disposed at the upper portion of the internal space S1 of the cabin 5, even if the hydrogen gas leaks, the leakage of the hydrogen gas can be detected in an early stage and can be dealt with.

The ceiling wall 43 of the cabin 5 is further provided with the exhaust door 53 that is opened when the hydrogen-gas detection portion 52 detects the hydrogen gas and that causes the internal space S1 of the cabin 5 and the outside to be in communication with each other.

With this configuration, it is possible to automatically open the exhaust door 53 quickly when detecting leaked hydrogen gas and immediately discharge the leaked hydrogen gas upward from the inside of the cabin 5 since the exhaust door 53 interlocked with the hydrogen-gas detection portion 52 is provided in the ceiling wall 43.

The cabin 5 is further provided with the ventilator 63 that performs ventilation of the internal space S1 of the cabin 5. The ventilator 63 performs the ventilation at least while the hydrogen tanks 25 supply the hydrogen gas to the fuel cell 22.

With this configuration, it is possible to suppress an increase in the temperature of the internal space S1 of the cabin 5 and eventually possible to suppress a temperature increase of the hydrogen tanks 25 since the ventilation of the internal space S1 of the cabin 5 is performed at least while the hydrogen tanks 25 supply the hydrogen gas to the fuel cell 22.

The working machine 1 further includes the hydrogen-gas detection portion 52 that detects the hydrogen gas. The ventilator 63 increases the output of the ventilation when the hydrogen-gas detection portion 52 detects the hydrogen gas.

With this configuration, when leakage of the hydrogen gas from the hydrogen tanks 25 occurs, the leaked hydrogen gas in the inside of the cabin 5 can be discharged to the outside of the cabin 5.

The working machine 1 further includes the air conditioning unit 46 that generates cooling air and that introduces the cooling air to the inside of the cabin 5. The cabin 5 is provided with the cooling passage through which the cooling air introduced from the air conditioning unit 46 passes the outer peripheries of the hydrogen tanks 25.

With this configuration, a temperature increase of the hydrogen tanks 25 can be further suppressed since the cooling air introduced from the air conditioning unit 46 passes the outer peripheries of the hydrogen tanks 25.

The working machine 1 further includes the air conditioning unit 46 that introduces outside air to the inside of the cabin 5. The outside-air intake port 51 for the air conditioning unit 46 is provided in the cabin 5, and the guide passage 45 through which the outside air taken in from the outside-air intake port 51 passes the outer peripheries of the hydrogen tanks 25 is provided.

With this configuration, it is possible to adjust the temperature at the peripheries of the hydrogen tanks 25 without additionally providing a cooler for the high-pressure hydrogen tanks 25 intentionally since the air conditioning unit 46 that adjusts air in the inside of the cabin 5 is included. Further, since the outside air taken in from the outside-air intake port 51 in the ceiling wall 43 passes the peripheries of the hydrogen tanks 25 in the inside of the ceiling space (guide passage 45), it is possible to efficiently use the outside air for the air conditioning unit 46 to cool the hydrogen tanks 25.

The ceiling wall 43 of the cabin 5 has the double structure including the first wall 43a on the upper side and the second wall 43b on the lower side, and the guide passage 45 is formed by the space defined by the first wall 43a and the second wall 43b.

With this configuration, the ceiling wall 43 of the cabin 5 has the double structure including the first wall 43a on the upper side and the second wall 43b on the lower side, and the ceiling space between the first wall 43a and the second wall 43b is used as the guide passage 45 for outside-air introduction of the air conditioning unit 46. Accordingly, it is possible to reduce the costs of the vehicle and maintain the compact characteristics since the existing structure is used, without additionally providing the guide passage 45 for outside-air introduction of the air conditioning unit 46.

The ceiling wall 43 of the cabin 5 has the double structure including the first wall 43a on the upper side and the second wall 43b on the lower side, and the hydrogen tanks 25 are disposed in the space defined by the first wall 43a and the second wall 43b.

With this configuration, the function of protecting the high-pressure hydrogen tanks 25 from external obstacles is improved since the hydrogen tanks 25 are disposed in the ceiling space between the first wall 43a and the second wall 43b.

The working machine 1 further includes the housing case 70 that houses the hydrogen tank 25, and the housing case 70 stores water that cools the hydrogen tank 25.

With this configuration, it is possible to efficiently cool the high-pressure hydrogen tank 25 actively and also possible with respect to impact or vibration from the outside to further absorb the impact or the vibration by buffering by water.

The working machine 1 further includes the housing case 70 that houses the hydrogen tank 25, and the hydrogen tank 25 is installed via the vibration absorbing members 71 with respect to the placement surface formed in the inside of the housing case 70.

With this configuration, it is possible to further absorb impact or vibration by the absorbing effect of the vibration absorbing members 71.

The hydrogen tank 25 has the liner having the internal space S1 filled with the hydrogen gas, and the outer surface of the liner is covered with the carbon fiber reinforced plastic layer 61.

With this configuration, it is possible to house a large amount of the hydrogen gas while reducing the weight of the hydrogen tank 25, which achieves easy handling of the hydrogen tank 25 and a reduction in the weight of a vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
   a vehicle body;
   a traveling device that supports the vehicle body;
   a drive that drives the traveling device; and
   a cabin that accommodates an operator seat,
   wherein the drive has
      a drive motor that drives the traveling device,
      a fuel cell that supplies electric power to the drive motor,
      a controller that controls power supply from the fuel cell to the drive motor, and
      a hydrogen tank that supplies a hydrogen gas for fuel to the fuel cell, and
   wherein the hydrogen tank is disposed in an upper portion of an internal space of the cabin.

2. The working machine according to claim 1, further comprising:
   a hydrogen-gas detection portion that detects the hydrogen gas,
   wherein the hydrogen-gas detection portion is disposed in the upper portion of the internal space of the cabin.

3. The working machine according to claim 2,
   wherein an exhaust door that is opened when the hydrogen-gas detection portion detects the hydrogen gas and that causes the internal space of the cabin and an outside to be in communication with each other is further provided in a ceiling wall of the cabin.

4. The working machine according to claim 1,
   wherein a ventilator that performs ventilation of the internal space of the cabin is further provided in the cabin, and
   wherein the ventilator performs the ventilation at least while the hydrogen tank supplies the hydrogen gas to the fuel cell.

5. The working machine according to claim 4, further comprising:
   a hydrogen-gas detection portion that detects the hydrogen gas,
   wherein the ventilator increases an output of the ventilation when the hydrogen-gas detection portion detects the hydrogen gas.

6. The working machine according to claim 1, further comprising:
   an air conditioning unit that generates cooling air and that introduces the cooling air to an inside of the cabin,
   wherein the cabin is provided with a cooling passage through which the cooling air introduced from the air conditioning unit passes an outer periphery of the hydrogen tank.

7. The working machine according to claim 1, further comprising:
   an air conditioning unit that introduces outside air to an inside of the cabin,
   wherein an outside-air intake port for the air conditioning unit is provided in the cabin, and a guide passage through which the outside air taken in from the outside-air intake port passes an outer periphery of the hydrogen tank is provided.

8. The working machine according to claim 7,
wherein a ceiling wall of the cabin has a double structure including a first wall on an upper side and a second wall on a lower side, and
wherein the guide passage is formed by a space that is defined by the first wall and the second wall.

9. The working machine according to claim 1,
wherein a ceiling wall of the cabin has a double structure including a first wall on an upper side and a second wall on a lower side, and
wherein the hydrogen tank is disposed in a space that is defined by the first wall and the second wall.

10. The working machine according to claim 1, further comprising:
a housing case that houses the hydrogen tank,
wherein the housing case stores water that cools the hydrogen tank.

11. The working machine according to claim 1, further comprising:
a housing case that houses the hydrogen tank,
wherein the hydrogen tank is installed via a vibration absorbing member with respect to a placement surface formed in an inside of the housing case.

12. The working machine according to claim 1,
wherein the hydrogen tank has a liner that has the internal space filled with the hydrogen gas, and
wherein an outer surface of the liner is covered with a carbon fiber reinforced plastic layer.

\* \* \* \* \*